United States Patent [19]

Nemphos et al.

[11] Patent Number: 5,464,878
[45] Date of Patent: Nov. 7, 1995

[54] DEGRADABLE POLYMERIC FORM AND PROCESS FOR MAKING

[75] Inventors: Speros P. Nemphos, League City, Tex.; James T. McQueen, Jaffrey, N.H.

[73] Assignee: Camelot Technologies, Inc., Calgary, Canada

[21] Appl. No.: 75,118

[22] Filed: Jun. 11, 1993

[51] Int. Cl.$^6$ ............................................. C08G 9/00
[52] U.S. Cl. ........................ 521/50; 524/601; 524/602; 525/191; 525/198
[58] Field of Search ........................ 521/50; 524/601, 524/602; 525/191, 198

[56] References Cited

U.S. PATENT DOCUMENTS

| | | | |
|---|---|---|---|
| 3,867,324 | 2/1975 | Clendinning et al. | 358/217 |
| 3,932,319 | 1/1976 | Clendinning et al. | 47/66 |
| 5,185,408 | 2/1993 | Tang et al. | 525/415 |

FOREIGN PATENT DOCUMENTS

| | | |
|---|---|---|
| 0273069 | 7/1988 | European Pat. Off. . |
| 56-22324 | 3/1981 | Japan . |
| WO8000659 | 4/1980 | WIPO . |

OTHER PUBLICATIONS

Chemical Abstract 110(17);153035e Glucomannan/polyhydric alcohol composition and film prepared therefrom. Kubodera, M. Japan, EP86118163; (1986).
Chemical Abstract 93(24):225641e Food and pharmaceutical coating composition. Banker, Gilbert Stephen. U.S.A.—78-847048, (1978).
Chemical Abstract 84(19):135650e 2–(5 or 3–Pyrazolyl)benzophenones. Gachwend, Heinz W., Switzerland–US 74–475474, (1974).
Chemical Abstract 84(4):18707e Environmentally degradable biodegradable blends of a dialkanoyl polymer . . . Clendinning, R. US72–275971, (1972).
Chemical Abstract 84(20):136650d Blends of biodegradable thermoplastic dialkanoyl polymer . . . Clendinning, R., et al, US72–275973, (1972).
Chemical Abstracts 95(8):63389r Biodegradable mulch films. Japan JP56022324, (1980).

*Primary Examiner*—James J. Seidleck
*Assistant Examiner*—Terressa M. Mosley
*Attorney, Agent, or Firm*—Stevens, Davis, Miller & Mosher

[57] ABSTRACT

A degradable polymeric foam having a density of not more than 16 lb. per cu ft. comprising a polymer alloy comprising:

(i) from 50 to 100% of one or more co or homopolymers having a molecular weight of greater than 40,000 comprising the residues of one or more monomers of the Formula:

$$-OCR_1R_2(CR_3R_4)_n CO-  \quad\quad (I)$$

or $$-OCH(CH_3)CO- \quad\quad (II)$$

wherein in Formula I, $R_1$, $R_2$, $R_3$, and $R_4$ are independently selected from the group consisting of a hydrogen atom and a $C_{1-4}$ alkyl radical, and n is zero or an integer from 1 to 5, provided that when a monomer residue of Formula II is present and in Formula I n is 1 and $R_2$, $R_3$, and $R_4$ are hydrogen, $R_1$ can not be a methyl radical; and (ii) from 0 to 50 weight % of one or more polymers selected from the group consisting of polymers having a Hildebrand parameter ($\sigma$) of not more than 3 MPA$^{1/2}$ different from that of the one or more co or homopolymers.

41 Claims, No Drawings

DEGRADABLE POLYMERIC FORM AND PROCESS FOR MAKING

FIELD OF INVENTION

The present invention relates to degradable foams of polymers or polymer alloys. More particularly the present invention relates to foams of polymers or polymer alloys which will begin to degrade or will totally degrade when left in the natural environment.

BACKGROUND OF THE INVENTION

There are a number of polymers which are referred to as biodegradable polymers. Until quite recently these polymers have been used in high value add applications such as the medical and/or pharmaceutical field. Polymers such as polylactic acid or polylactides, polyhydroxybutyrate (PHB) and copolymers of hydroxy butyrate and valerate (PHBV) have been used to make articles such as absorbable sutures, osteo pins and screws, and in the field of controlled release drugs.

These types of polymers will "biodegrade" within a relatively short period of time, for example from about 6 to 12 weeks depending on the molecular weight and the polymer stereo chemistry.

There are some patents which disclose the use of such polymers in applications which are typically met by commodity polymers. These applications include for example films such as disclosed in Chemical Abstracts 95:63389r of Japanese Kokai JP 56/22324 which discloses a biodegradable mulch film; Chemical Abstracts 84:135650d and 84:18707e of U.S. Pat. Nos. 3,932,319 and 3,867,324 both assigned to Union Carbide which disclose films and molded plant holders of biodegradable polymers. Additionally, there is some art relating to films used in food packaging such as disclosed in Chemical Abstracts 110:153035e of European Patent Application 273 069 which discloses films of glacomannan as a food packaging and Chemical Abstracts 93:225641e of WO 80/659 which disclose latices of ethyl cellulose as a food coating. None of this art suggests a foamed degradable polymer.

The above art does not disclose that such polymers could be foamed. However, there is a need for degradable foamed polymeric products. Such products could be formed into trays for packaging cold products such as meat trays, or insulators for cold drinks, or for higher temperature applications such as containers for hot foods such as hot drinks or "fast food" such as hamburgers and the like (e.g. foamed trays and/or "clam shells").

Unfortunately the above type of packaging may be discarded by insensitive individuals causing unsightly waste. If such containers could be made from a polymer or polymer alloy which was degradable the problem of litter would be lessened.

Accordingly, there is a need for a degradable foamed polymeric composition. The present invention seeks to provide such a composition.

SUMMARY OF THE INVENTION

The present invention provides a degradable polymeric foam having a density of not more than 16 lb/cubic foot comprising a polymer alloy comprising:

(i) from 50 to 100% of one or more co or homopolymers having a visosity average molecular weight of greater than 40,000 comprising the residues of one or more monomers of the Formula:

$$—OCR_1R_2(CR_3R_4)_nCO—$$   I and

$$—OCH(CH_3)CO—$$   II wherein in Formula I, $R_1$, $R_2$, $R_3$, and $R_4$ are independently selected from the group consisting of a hydrogen atom and a $C_{1-4}$ alkyl radical, and n is 0 or an integer from 1 to 5, provided that when a monomer residue of Formula II is present, and in Formula I n is 1 and $R_2$, $R_3$, and $R_4$ are hydrogen, $R_1$ can not be a methyl radical; and (ii) from 0 to 50 weight % of one or more polymers selected from the group consisting of polymers having a Hildebrand parameter ($\sigma$) of not more than 3 $MPA^{1/2}$ different from that of said one or more co or homopolymers.

The solution viscosity method for determining molecular weights was the method utilized in the present invention to determine the viscosity average molecular weights of the polymers.

The present invention also provides a process for preparing a polymeric foam having a density of not more than 16 lb/cubic foot comprising a polymer alloy comprising:

(i) from 50 to 100% of one or more co or homopolymers having a viscosity average molecular weight of greater than 40,000 comprising the residues of one or more monomers of the Formula:

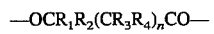

$$—OCR_1R_2(CR_3R_4)_nCO—$$   I and

$$—OCH(CH_3)CO—$$   II wherein in Formula I, $R_1$, $R_2$, $R_3$, and $R_4$ are independently selected from the group consisting of a hydrogen atom and a $C_{1-4}$ alkyl radical, and n is 0 or an integer from 1 to 5, provided that when a monomer residue of Formula II is present and in Formula I n is 1 and $R_2$, $R_3$, and $R_4$ are hydrogen, $R_1$ can not be a methyl radical; and (ii) from 0 to 50 weight % of one or more polymers selected from the group consisting of polymers having a Hildebrand parameter ($\sigma$) of not more than 3 $MPA^{1/2}$ different from that of the above co or homopolymer which comprises passing a melt of said polymer alloy through a heated shear zone and concurrently injecting into said melt at pressures up 6,000 psi a gaseous or liquid blowing agent which will not significantly decompose the polymer alloy; extruding the melt; and letting the melt expand.

DETAILED DESCRIPTION

The foams of the present invention should have a density of less than 16, more preferably less than 12, most preferably less than 8 lb/cubic foot.

The foamed compositions of the present invention may comprise a biodegradable polymer per se or an alloy of a biodegradable polymer. In the polymers noted above if the polymer is a homopolymer containing only the residues of Formula II the polymer is a polymer of lactic acid or lactide. The monomers of Formula II may be in either a D or L configuration. If the polymer is prepared from lactide, the lactide may be in either the D, L, or meso configuration.

The degree of crystallinity in the polymer may have some impact on the formation of the foam and the foam structure. For example, it may be desirable to orient the polymer to try to increase its heat distortion temperature. For lactide polymers (e.g. homopolymers of Formula II) the degree of crystallinity falls off rapidly with increasing amounts of the D or meso configuration. That is polymers having at least 80, preferably 90, most preferably 95 weight % of the monomer in the L configuration tend to have increasing crystallinity. Conversely if the polymer contains less than about 80 weight % of monomer in the L configuration then the polymer tends to be amorphous.

If the polymer is a polymer containing monomer residues of Formula I it may be a number of polymers. If in Formula I $R_3$, $R_4$, and one of either $R_2$, or $R_1$, are hydrogen atoms and the other of $R_2$, and $R_1$ is a methyl radical and n is 1 then the polymer would be a homopolymer of β-hydroxy butyrate, sometimes referred to as PHB. If in Formula I $R_3$ and $R_4$ are hydrogen and one of $R_1$ and $R_2$ is hydrogen and the other is an ethyl radical and n is 1 then the polymer would be a homopolymer of β-hydroxy valerate, sometimes referred to as PHV. Of course it is possible to have copolymers of such monomers as in the case of poly hydroxy butyrate-valerate copolymers, sometimes referred to as PHBV. Generally these polymers are obtained from the biofermentation of a suitable substrate using a microorganism which produces the polymer.

If the polymer contains residues of Formula I and n is 0 and $R_1$, and $R_2$ are hydrogen atoms then the monomer is glycolic acid. Similar to the case with lactic acid the polymer may be prepared from the monomers or from glycolide.

Preferably the polymers containing monomer residues of Formula I and/or II above will have a viscosity average molecular weight of not less than 40,000 preferably not less than 80,000. Preferably the polymers should have an intrinsic viscosity of not less than about 1.5 more preferably 2.0 or greater (as determined by ASTM method D2857, preferred solvent chloroform at 30° C. and concentration of 0.5 g/ml of solution).

The present invention may be practiced using degradable polymers of monomers residues of Formula I or II above or blends of such polymers or blends of such polymers with other polymers having a Hildebrand parameter (σ) of not more then 3, preferably less than 2 MPA$^{1/2}$ different from that of the polymers of monomer residues of Formula I and II above.

The melt of the polymer alloy should not separate under shear and the to form and retain a foam structure on leaving the reactor.

Preferably the less degradable polymers are selected from the group consisting of:
(i) polymers comprising:
  (a) from 80 to 20, preferably from 40 to 60 weight % of one or more $C_{8-12}$ vinyl aromatic monomers which are unsubstituted or substituted by alkyl radical; and
  (b) from 20 to 80, preferably from 60 to 40 weight % of one or more monomers selected from the group consisting of $C_{1-6}$ alkyl esters of $C_{3-6}$ ethylenically unsaturated carboxylic esters, anhydrides of $C_{4-6}$ ethylenically unsaturated dicarboxylic acids and $C_{3-6}$ alkenyl nitriles which polymers may optionally contain up to 15% of an impact modifier which is a rubbery polymer of one or more $C_{4-6}$ conjugated diolefins;
(ii) polymers comprising:
  (a) homopolymers of $C_{2-6}$ alkenyl halides;
(iii) polymers comprising co and homopolymers of $C_{2-4}$ olefins;
(iv) polycarbonates;
(v) polymers comprising:
  from 100 to 50 weight % of one or more $C_{1-6}$ alkyl or hydroxy alkyl acrylates or methacrylates; from 0 to 50 weight % of one or more $C_{8-12}$ vinyl aromatic monomers which are unsubstituted or substituted by a $C_{1-4}$ alkyl radical which polymers have been imidized to at least 10%;
(vi) polymers of amides of $C_{3-6}$ ethylenically unsaturated carboxylic acids;
(vii) poly phenylene ethers (also called polyphenylene oxides);
(viii) polysulphones;
(ix) polysiloxaines;
(x) polyimines;
(xi) polyesters of $C_{8-10}$ aromatic dicarboxylic acids and $C_{2-4}$ alkylene glycols;
(xii) polyacetals;
(xiii) cellulose esters; and
(xiv) ionomers.

Suitable polymers of alkenyl halides include polyvinyl chloride.

Suitable co and homopolymers of $C_{2-4}$ olefins include polyethylene, polypropylene and ethylene-propylene copolymers.

Suitable $C_{8-12}$ vinyl aromatic monomers include styrene, α-methyl styrene, p-methyl styrene and t-butyl styrene.

Suitable $C_{1-6}$ alkyl esters of $C_{3-6}$ ethylenically unsaturated carboxylic acids include methyl acrylate, ethyl acrylate, butyl acrylate, methyl methacrylate, ethyl methacrylate, and butyl methacrylate.

Suitable anhydrides of $C_{4-6}$ ethylenically unsaturated carboxylic acids include maleic anhydride.

Suitable $C_{3-6}$ alkenyl nitriles include acrylonitrile and methacrylonitrile.

Accordingly, the non- or less degradable polymers may comprise homopolymers of polystyrene which may or may not have a specific steric configuration such as syndiotactic polystyrene and possibly isotactic polystyrene. The polymer could be a copolymer of various styrenic monomers such as a copolymer of styrene and α-methyl styrene.

The non- or less degradable polymer could be a copolymer comprising one or more of styrene, α-methyl styrene, p-methyl styrene and t-butyl styrene and up to 50 weight % of one or more monomers selected from the above noted monomers. Accordingly, the polymer could be a copolymer of: styrene and methyl methacrylate; styrene and ethyl methacrylate; styrene and butyl acrylate; styrene and methyl acrylate; styrene and ethyl acrylate; styrene and butyl acrylate; styrene and maleic anhydride; styrene and acrylonitrile; and styrene and methacrylonitrile. However, it should be noted that the polymer does not have to be a copolymer. It could contain a third or fourth monomer. For example, all of the above polymers could be carboxylated. That is they could contain a copolymerizable carboxylic acid which is a $C_{3-6}$ ethylenically unsaturated carboxylic acid such as acrylic acid, methacrylic acid, itaconic acid and fumaric acid. Further polymers within the scope of the present disclosure are known to those skilled in the art.

The biodegradable polymer may be blended with a polycarbonate. The polycarbonate may be based on one or more polyphenols selected from the group consisting of hydroquinone, resorcinol and polyphenols of the Formula

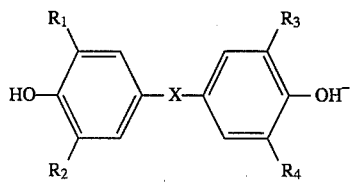
III wherein $R_1$, $R_2$, $R_3$ and $R_4$ are independency selected from the group consisting of a hydrogen atom, a chlorine atom, a bromine atom and a $C_{1-4}$ alkyl radical; and X is a bond or divalent radical selected from the group consisting of $C_{1-10}$ alkylene radicals, $C_{2-8}$ alkenylene radicals and $C_{6-8}$ cycloalkylene radicals.

Preferably, the polycarbonate is based on a diphenol selected from the group consisting of 4,4'dihydroxydiphenyl; 2,2bis-(4-hydroxyphenyl) propopane; 2,4-bis-(4-hydroxyphenyl)-2-methylbutane; 1,1-bis(4-hydroxyphenyl)-cyclohexane; β,β-bis-(4-hydroxyphenyl)-p-diisopropylbenzene; 2,2-bis-(3-chloro-4-hydroxyphenyl)propane; 2,2-bis-(3,5-dichloro-4-hydroxyphenyl)propane.

The biodegradable polymer may be blended with a polymer comprising: from 40 to 95 weight % of one or more $C_{8-12}$ vinyl aromatic monomers which are unsubstituted or substituted by a $C_{1-4}$ alkyl radical; $C_{1-6}$ alkyl or hydroxy alkyl acrylates or methacrylates; from 3 to 40 weight % of an anhydride of a $C_{4-6}$ ethylenically unsaturated dicarboxylic acid; from 0 to 50 weight % of one or more $C_{1-6}$ alkyl or hydroxy alkyl acrylates or methacrylates.

Preferably, the vinyl aromatic monomer may be present in the polymer in an amount from 40 to 80 weight %. The anhydride may be present in the polymer in an amount from 5 to 35 weight % and the acrylate or methacrylate may be present in the polymer in an amount from 2 to 30 weight %.

In the above non-biodegradable polymer the aromatic monomer may selected from the group consisting of styrene, α-methyl styrene and t-butyl styrene; the anhydride may maleic anhydride; and the $C_{1-4}$ alkyl or hydroxy alkyl acrylate or methacrylate may be selected from the group consisting of methyl acrylate, ethyl acrylate, methyl methacrylate and ethyl methacrylate.

The biodegradable polymer may be blended with an imide. The imide may comprise: from 100 to 50 weight % of one or more $C_{1-6}$ alkyl or hydroxy alkyl acrylates or methacrylates; from 0 to 50 weight % of one or more $C_{8-12}$ vinyl aromatic monomers which are unsubstituted or substituted by a $C_{1-4}$ alkyl radical which polymers have been imidized to at least 10%.

Preferably, the polymer will have been imidized to from 10 to 95%, most preferably from about 50 to 95%, most preferably from 65 to 95%. A process for preparing such polymers is disclosed in U.S. Pat. No. 4,246,374 issued Jan. 20, 1981, assigned to Rohm and Hass Company.

Preferably, the polymer may comprise from 100 to 70 weight % of (meth)acrylate monomers and from 0 to 30 weight % of vinyl aromatic monomers.

In the above non-biodegradable polymers the $C_{1-4}$ alkyl or hydroxy alkyl acrylate or methacrylate may be selected from the group consisting of methyl acrylate, ethyl acrylate, methyl methacrylate and ethyl methacrylate and the vinyl aromatic monomer may be selected from the group consisting of styrene, α-methyl styrene and t-butyl styrene.

The biodegradable polymer my be blended with polymers of amides $C_{3-6}$ ethylenically unsaturated carboxylic acids. Acrylamide and methacrylamide and co and homopolymers thereof are suitable for use in accordance with the present invention.

The biodegradable polymer may be blended with a polyphenylene ether (also called oxides). Generally, polyphenylene ether are polymers having a backbone containing recurring monomer units of the Formula

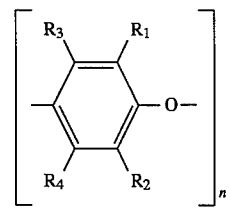

wherein $R_1$, $R_2$, $R_3$, and $R_4$ are independently selected from the group consisting of a hydrogen atom, a halogen atom, preferable chlorine or bromine, an alkyl radical, preferably containing less than 10, most preferably containing from 1 to 4 carbon atoms, and a $C_{6-10}$ aromatic radical which is unsubstituted or substituted by an alkyl radical, preferably containing less than 10, most preferably containing from 1 to 4 carbon atom; and n is an integer from 300 to 700. The polymer may contain other monomeric units; that is, it need not be a homopolymer of only one 1,4 phenylene oxide monomer. For example, the polymer could be poly [oxy-2-acetoxytrinethyleneoxy-1,4-phenylenemethyl (phenyl) methylene-1,4-phenylene], having Tg of 110° C.

The biodegradable polymer may be blended with a polysulphone. Generally, polysulphones comprise a backbone of one or more recurring units selected from the group consisting of:

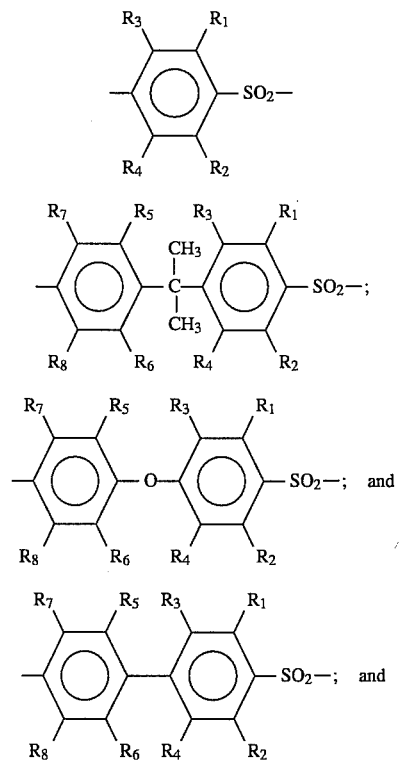

wherein $R_1$, $R_2$, $R_3$, $R_4$, $R_5$, $R_6$, $R_7$, and $R_8$ are independently selected from the group consisting of a hydrogen atom, a halogen atom, preferably chlorine or bromine, or an alkyl radical, preferably containing less than 10, most preferably containing from 1 to 4 carbon atoms and a $C_{6-10}$ aromatic radical which is unsubstituted or substituted by an alkyl radical preferably containing less than 10, most preferably containing from 1 to 4 carbon atoms.

The biodegradable polymer may be blended with a polysiloxane. Typically, polysiloxones contain a backbone of recurring units of the Formula:

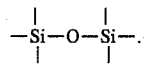

A suitable siloxane is poly[oxy (methyl)phenysllyleneoxy-1,4 -phenylene] (Tg 95° C.).

The biodegradable polymer may be blended with an imine. Typically, imines contain the functional group—NH—. The imines are cyclic compounds and may be considered nitrogen homologues of epoxides. A suitable imine is poly(benzoyliminoethylene) (Tg 105).

The biodegradable polymer may be blended with polyesters of $C_{8-10}$ aromatic dicarboxylic acids and $C_{2-4}$ alkylene glycols. Such esters may optionally further comprise up to about 15, preferably less than 10 weight % of one or more saturated aliphatic dicarboxylic acids such as adipic acid. These saturated aliphatic dicarboxylic acids may make the polyester more susceptible to degradation. Industrially, the most common aromatic dicarboxylic acids are the terephthalic acids. Industrially, the most common diols are ethylene and butylene glycols. The polyesters may be selected from the group consisting of polyethylene terephthalate (PET) and polybutylene terephthalate.

The non-degradable resin may be a polyacetyl. These thermoplastic resins have repeating formaldehyde units in their backbone. The polymerization is initiated using an ionic initiator such as a tertiary amine or an ammonium salt. The polymer is then end capped to yield a polyoxymethylene polymer.

The polymer other than one of Formula I or II may be a lower, $C_{1-6}$ alkyl ester of a polysaccharide such as cellulose. An industrially available ester is cellulose acetate.

The non-degradable polymer may be an ionomer. Typically the ionomer is a partially neutralized polymer of methacrylic acid and ethylene. Typically these types of polymers are neutralized with sodium and/or zinc cations although other cations may also be suitable. Commercially ionomers are available under the trademark SURLYN®.

Typically the polymers alloyed or blended with the polymer containing monomer residues of Formula I and/or II will have a viscosity average molecular weight of not less than 100,000, preferably from 100,000 to about 300,000.

The polymers or alloys of the present invention may be filled. That is they may contain up to about 50 preferably less than 45, more preferably from about 5 to 45, most preferably from 10 to 35 weight % of one or more fillers. While conventional inorganic fillers such as talc, calcium carbonate, clay, mica and the like may be used it is also possible to use organic fillers. A particularly useful class of organic fillers include polysaccharides. Particularly useful polysaccharides include starch, functionalized starch, functionalized cellulose, wood flour, flour of nut shells, cotton and linen fiber, flock or flour, or a mixture thereof. Particularly useful organic fillers include cellulose, α-cellulose, wood flour, and nut shell flour. While either the organic or inorganic fillers may be used the organic fillers are also degradable and are particularly useful from the point of view of preparing a foam based on a degradable polymer and degradable filler.

If there are problems with foaming the polymer or alloy it may be due to poor polymer rheology. In such a case the rheology may be improved by incorporating a plasticizer into the polymer or alloy. Many plasticizers are known to those skilled in the art. Generally one would seek to use an innocuous plasticizer. For some biodegradable polymers such as the polylactic acids the monomer may also serve as a plasticizer. The plasticiser could be used in amounts up to about 10 weight %, preferably from about 3 to 7 weight %. Of course if the polymer is not too "stiff" in the form of a melt the plasticizer could be dispensed with.

In the process of the present invention a melt of the polymers containing monomer residues of Formula I and/or II and alloys thereof optionally containing filler are passed through a shear zone. Typically the shear zone will constitute the barrel of an extruder. The extruder may be twin or single screw extruder. In many foaming operations back to back extruders are used. In the first extruder the polymer mixture forms a melt. Gas is injected into the first extruder, and the gas and melt are passed through a series of mixers and into the second extruder. The second extruder brings the temperature of the melt to that most desirable to create foam.

The extruders may be operated at barrel zone temperatures up to 180° C., preferably from 120° to 170° C. and the die temperatures may be up to about 150° C. preferably from 100° to 130° C. Due to the relatively low temperature differential between the extrusion temperature and the ambient temperature it may, particularly in cases where the polymer or alloy has a low melt viscosity be desirable either to extrude the foam into a cooling environment such as a chiller or to extrude the foam onto a moving support until the foam stabilizes. The shear within the extruder is provided by the screw which may be operated at speeds from about 50 to 150, most preferably from about 80 to 120 RPM's. Typically the screw for the extruder will have a D/L ratio from about 20/1 to 40/1 preferably from about 24/1:36/1. In some embodiments of the present invention it is possible to use an extruder in series with a static mixer. Typically in the extruder one or more sections of flights of the screws downstream from the injection of the blowing agent may be fitted with mixing pins. These are short generally cylindrical pins extending from the screw to provide a close tolerance with the internal wall of the extruder barrel. These pins serve to mix the molten polymer and blowing gas to provide a uniform dispersion of the blowing gas or agent through out the polymer melt prior to extrusion.

Preferably, in accordance with the present invention a gaseous or liquid blowing agent is injected into the polymer melt in the extruder. Typically the blowing agent or gas may be injected at pressures up to 6,000, most preferably up to about 4,000, preferably less than 3,000 psi. The injection pressure required is a function of a number of variables including the final density of the foam, the solubility of the blowing agent in the polymer melt and the type of blowing agent. In the past the blowing agents were lower ($C_{4-6}$) alkanes such butane pentane and even hexane. These blowing agents would vaporize at the temperatures in the melt. The biggest drawback of such agents was their flammability. These types of blowing agents were replaced by the CFC's (chlorofluorocarbons) such as FREON (tradename) and the like. Typically, these blowing agents may be characterized as $C_{1-4}$ alkanes which are substituted by not less than two halogen atoms selected from the group consisting of chlorine and fluorine atoms. Recently, these blowing agents have come under scrutiny due to concerns regarding ozone depletion in the upper atmosphere. Currently there is a move towards using gases taken from the atmosphere such as carbon dioxide and nitrogen which are well known and industrially used in some foaming operation.

Care should be exercised in selecting the blowing agent. The solubility of the blowing agent in the polymer or polymer blend will affect the quality of foam. If the blowing agent is very soluble in the polymer or alloy it may act as a plasticizer reducing the viscosity of the polymer or alloy melt making it difficult to maintain a good cell structure in the foam. If the blowing agent is not sufficiently soluble in the polymer or alloy it is not dispersed evenly through out the melt of polymer or alloy and tends to "pop" out of the melt of polymer when it exits the extruder.

In accordance with good manufacturing practice the compositions in the extruder may contain a nucleating agent for the blowing agent. The nucleating agent or system may comprise a system which forms voids or bubbles or places for voids or bubbles to form. Some nucleating agents are inorganic particulates such as talc. Some nucleation systems comprise a carbonate or bicarbonate salt such as sodium bicarbonate and an organic acid such as citric acid. The acid and bicarbonate are mixed in about equal weight ratios typically from 40:60 to 60:40, most preferably about 50:50. The nucleation system may be used in amounts from 0.5 to 5, preferably from 1 to 3 weight % based on the weight of the components in the polymer or polymer alloy.

The melt of polymer or polymer alloy will be extruded in molten form from the extruder. When it is subjected to the reduced atmospheric pressure outside the extruder the blowing agent or gas expands or further expands. The foamed polymer may be extruded as a sheet or as a tube or some such other form. The foamed product may be subsequently heated and thermoformed into final products.

The present invention will now be illustrated by the following non-limiting examples in which unless other wise specified parts are parts by weight and % is weight %.

Example 1

An amorphous poly lactic acid polymer was prepared from lactide which contained a total of 86 weight % of both the D and L configuration of monomer and 14 weight % of monomer in the meso configuration (e.g. the polymer contained less than 80 weight % of either the D or L configuration of monomer). The polymer was prepared by polymerizing the lactide in the presence of stannous octoate. The polymer had an intrinsic viscosity of about 1.0 and a viscosity average molecular weight of about 80,000. The polymer had a residual monomer content of about 4 weight % which acted as a plasticizer reducing the melt viscosity and strength.

The polymer was fed to a brabender extruder which fed into a heated static mixer. The brabender/static mixer tandem was operated under the following temperature conditions:

| | |
|---|---|
| Melting Zone | 140–160° C. |
| Foaming Agent Mixing Zone | 150–170° C. |
| Static Mixers/Cooling Zone | 120–150° C. |
| Die | 100–130° C. |

The RPM's of the brabender was 40.

The screw on the brabender was modified by having a zone which had injected mixing pins in the flights of the screw. The blowing agent was into the brabender shortly above the zone of the modification to the screw as described.

The blowing agent was halocarbon 22 ($CHCLF_2$) and it was injected at a pressure of 1,000 psi.

The foam was extruded through a 1/16 inch capillary die and expanded to yield foams rods having a diameter from 1/4 to 3/4 inches. The foam density was in the order of about 10–20 lb/cubic foot. The starting polymer had a density on the order of 70 lb/cubic foot. The foam was a closed cell foam.

The embodiments of the invention in which an exclusive property or privilege is claimed are defined as follows:

1. A degradable polymeric foam having a density of not more than 16 lb/cu ft. comprising a polymer alloy comprising:
   (i) from 50 to 100% of one or more co or homopolymers having a viscosity average molecular weight of greater than 40,000 comprising the residues selected from the group consisting of one or more monomers of the Formula:

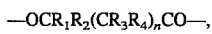
   $$-OCR_1R_2(CR_3R_4)_nCO-,\qquad\text{I}$$

one or more monomers of the formula

   $$-OCH(CH_3)CO-\qquad\text{II}$$

and mixture thereof, wherein in Formula I, $R_1$, $R_2$, $R_3$, and $R_4$ are independently selected from the group consisting of a hydrogen atom and a $C_{1-4}$ alkyl radical, and n is zero or an integer from 1 to 5, provided that when a monomer residue of Formula II is present and in Formula I n is 1 and $R_2$, $R_3$, and $R_4$ are hydrogen, $R_1$ can not be a methyl radical; and
   (ii) from 0 to 50 weight % of one or more polymers selected from the group consisting of polymers having a Hildebrand parameter ($\sigma$) of not more than 3 $MPA^{1/2}$ different from that of said one or more co or homopolymers; provided that when component (ii) is present in the alloy, the intrinsic viscosity of the alloy melt permits the dispersion of a blowing agent throughout said melt and prevents separation of the component of the alloy.

2. The degradable polymeric foam according to claim 1, having a density of less than 12 lb/cubic foot.

3. The degradable polymeric foam according to claim 2, wherein said polymer having a Hildebrand parameter of not more than 3 $MPA^{1/2}$ is selected from the group consisting of:
   (i) polymers comprising:
      (a) from 100 to 50 weight % of one or more $C_{8-12}$ vinyl aromatic monomers which are unsubstituted or substituted by a $C_{1-4}$ alkyl radial; and
      (b) from 0 to 50 weight % of one or more monomers selected from the group consisting of $C_{1-6}$ alkyl esters of $C_{3-6}$ ethylenically unsaturated carboxylic esters, anhydrides of $C_{4-6}$ ethylenically unsaturated dicarboxylic acids and $C_{3-6}$ alkenyl nitriles which polymers may optionally contain up to 15% of an impact modifier which is a rubbery polymer of one or more $C_{4-6}$ conjugated diolefins;
   (ii) polymers comprising:
      (a) homopolymers of $C_{2-6}$ alkenyl halides;
   (iii) polymers comprising co and homopolymers of $C_{2-4}$ olefins;
   (iv) polymers comprising:
      from 100 to 50 weight % of one or more $C_{1-6}$ alkyl or hydroxy alkyl acrylates or methacrylates; from 0 to 50 weight % of one or more $C_{8-12}$ vinyl aromatic monomers which are unsubstituted or substituted by a $C_{1-4}$ alkyl radical which polymers have been imidized to at least 10%;

(v) polymers of amides of $C_{3-6}$ ethylenically unsaturated carboxylic acids;

(vi) polyphenylene ethers (also called polyphenylene oxides);

(vii) polysulphones;

(viii) polysiloxaines;

(ix) polyimines;

(x) polyesters of $C_{8-10}$ aromatic dicarboxylic acids and $C_{2-4}$ alkylene glycols;

(xi) polyacetals;

(xii) cellulose esters; and (xiii) ionomers.

4. The foam according to claim 3, wherein having a density of not greater than 8 lb/cubic foot.

5. The foam according to claim 4, wherein said polymer having monomer residues of Formula I and/or II has an intrinsic viscosity of not less than 1.5.

6. The foam according to claim 5, wherein said polymer comprises a homopolymer of monomer residues of Formula II.

7. The foam according to claim 5, wherein said polymer is a co or homopolymer of Formula I and is selected from the group consisting of homopolymers of glycolic acid, homopolymers of β-hydroxy butyrate, homopolymers of hydroxy valeric acid and copolymers of β-hydroxy butyric acid and hydroxy valeric acid.

8. The foam according to claim 5, comprising a blend of polymers of monomer residues of Formula II and monomer residues of Formula I.

9. The foam according to claim 8, wherein said polymer blend comprises a homopolymer of lactic acid and a co or homopolymer of one or more monomers selected from the group consisting of β-hydroxy butyrate and hydroxy valeric acid.

10. The foam according to claim 5, wherein said polymer has been filled with from 5–45 weight % of a filler.

11. The foam according to claim 10, wherein said filler is selected from the group consisting of starch, functionalized starch, functionalized cellulose, wood flour, flour of nut shells, cotton and linen fiber, flock or flour, or a mixture thereof.

12. The foam according to claim 6, wherein said polymer has been filled with from 5–45 weight % of a filler.

13. The foam according to claim 12, wherein said filler is selected from the group consisting of starch, functionalized starch, functionalized cellulose, wood flour, flour of nut shells, cotton and linen fiber, flock or flour, or a mixture thereof.

14. The foam according to claim 7, wherein said polymer has been filled with from 5–45 weight % of a filler.

15. The foam according to claim 14, wherein said filler is selected from the group consisting of starch, functionalized starch, functionalized cellulose, wood flour, flour of nut shells, cotton and linen fiber, flock or flour, or a mixture thereof.

16. The foam according to claim 8, wherein said polymer has been filled with from 5–45 weight % of a filler.

17. The foam according to claim 16, wherein said filler is selected from the group consisting of starch, functionalized starch, functionalized cellulose, wood flour, flour of nut shells, cotton and linen fiber, flock or flour, or a mixture thereof.

18. The foam according to claim 9, wherein said polymer has been filled with from 5–45 weight % of a filler.

19. The foam according to claim 18, wherein said filler is selected from the group consisting of starch, functionalized starch, functionalized cellulose, wood flour, flour of nut shells, cotton and linen fiber, flock or flour, or a mixture thereof.

20. A process for preparing a degradable polymeric foam having a density of not more than 16 lb/cubic foot comprising a polymer alloy comprising:

(i) from 50 to 100% of one or more co or homopolymers having a viscosity average molecular weight of greater than 40,000 comprising the residues selected from the group consisting of one or more monomers of the Formula:

$$—OCR_1R_2(CR_3R_4)_nCO—, \quad \text{I}$$

one or more monomers of the formula $$—OCH(CH_3)CO— \quad \text{II}$$

and mixtures thereof, wherein in Formula I, $R_1$, $R_2$, $R_3$, and $R_4$ are independently selected from the group consisting of a hydrogen atom and a $C_{1-4}$ alkyl radical, and n is zero or an integer from 1 to 5, provided that when a monomer residue of Formula II is present and in Formula I n is 1 and $R_2$, $R_3$, and $R_4$ are hydrogen, $R_1$ can not be a methyl radical; and (ii) from 0 to 50 weight % of one or more polymers selected from the group consisting of polymers having a Hildebrand parameter (σ) of not more than 3 $MPA^{1/2}$ different from that of said one or more co or homopolymers which comprises passing a melt of said polymer alloy having an intrinsic viscosity of at least 1.5 through a heated shear zone and concurrently injecting into said melt at pressures up 5,000 psi a gaseous or liquid blowing agent which will not significantly decompose the polymer alloy; extruding the melt; and letting the melt expand.

21. The process according to claim 20, wherein said heated shear zone comprises the barrel of an extruder.

22. The process according to claim 21, where in said heated shear zone is heated to temperatures up to 180° C.

23. The process according to claim 22, wherein said heated shear zone is operated at pressures up to 5,000 psi.

24. The process according to claim 23, wherein said extruder is a single screw extruder.

25. The process according to claim 24, wherein the screw in said single screw extruder comprises one or more zones with or without flights and which contain mixing pins.

26. The process according to claim 25, wherein said blowing agent is selected from the group consisting of $C_{3-6}$ alkanes, $C_{2-4}$ alkanes which are substituted by not less than three halogen atoms selected from the group consisting of chlorine and fluorine atoms; and carbon dioxide.

27. The foam according to claim 26, wherein said polymer having monomer residues of Formula I and/or II has an intrinsic viscosity of not less than 1.5.

28. The process according to claim 27, wherein said polymer alloy comprises a homopolymer of monomer residues of Formula II.

29. The foam according to claim 28, wherein said polymer is a co or homopolymer of Formula I and is selected from the group consisting of homopolymers of glycolic acid, homopolymers of β-hydroxy butyrate, homopolymers of hydroxy valeric acid and copolymers of β-hydroxy butyric acid and hydroxy valeric acid.

30. The foam according to claim 27, comprising a blend of polymers of monomer residues of Formula II and monomer residues of Formula I.

31. The process according to claim 30, wherein said polymer blend comprises a homopolymer of lactic acid and a co or homopolymer of one or more monomers selected from the group consisting of β-hydroxy butyrate and hydroxy valeric acid.

32. The foam according to claim 27, wherein said polymer has been filled with from 5–45 weight % of a filler.

33. The foam according to claim 32, wherein said filler is selected from the group consisting of starch, functionalized starch, functionalized cellulose, wood flour, flour of nut shells, cotton and linen fiber, flock or flour, or a mixture thereof.

34. The foam according to claim 28, wherein said polymer has been filled with from 5–45 weight % of a filler.

35. The foam according to claim 34, wherein said filler is selected from the group consisting of starch, functionalized starch, functionalized cellulose, wood flour, flour of nut shells, cotton and linen fiber, flock or flour, or a mixture thereof.

36. The foam according to claim 29, wherein said polymer has been filled with from 5–45 weight % of a filler.

37. The foam according to claim 36, wherein said filler is selected from the group consisting of starch, functionalized starch, functionalized cellulose, wood flour, flour of nut shells, cotton and linen fiber, flock or flour, or a mixture thereof.

38. The foam according to claim 30, wherein said polymer has been filled with from 5–45 weight % of a filler.

39. The foam according to claim 38, wherein said filler is selected from the group consisting of starch, functionalized starch, functionalized cellulose, wood flour, flour of nut shells, cotton and linen fiber, flock or flour, or a mixture thereof.

40. The foam according to claim 31, wherein said polymer has been filled with from 5–45 weight % of a filler.

41. The foam according to claim 40, wherein said filler is selected from the group consisting of starch, functionalized starch, functionalized cellulose, wood flour, flour of nut shells, cotton and linen fiber, flock or flour, or a mixture thereof.

\* \* \* \* \*